(12) United States Patent
Sorg et al.

(10) Patent No.: US 10,364,962 B2
(45) Date of Patent: Jul. 30, 2019

(54) LASER ACTIVATED REMOTE PHOSPHOR TARGET WITH LOW INDEX COATING ON PHOSPHOR, METHOD OF MANUFACTURE AND METHOD FOR RE-DIRECTING EMISSIONS

(71) Applicants: OSRAM GmbH, Munich (DE); OSRAM SYLVANIA Inc., Wilmington, MA (US)

(72) Inventors: Joerg Sorg, Regensburg (DE); Alan L. Lenef, Belmont, MA (US); Dennis Sprenger, Roethenbach a.d. Pegnitz (DE)

(73) Assignees: OSRAM GmbH, Munich (DE); OSRAM SYLVANIA Inc., Wilmington, MA (US)

( * ) Notice: Subject to any disclaimer, the term of this patent is extended or adjusted under 35 U.S.C. 154(b) by 65 days.

(21) Appl. No.: 15/439,980

(22) Filed: Feb. 23, 2017

(65) Prior Publication Data
US 2018/0238520 A1 Aug. 23, 2018

(51) Int. Cl.
| | | |
|---|---|---|
| *F21V 9/30* | (2018.01) | |
| *F21V 7/00* | (2006.01) | |
| *G02B 27/14* | (2006.01) | |
| *F21V 29/502* | (2015.01) | |
| *F21V 29/70* | (2015.01) | |
| *F21K 9/64* | (2016.01) | |

(52) U.S. Cl.
CPC ............ *F21V 9/30* (2018.02); *F21K 9/64* (2016.08); *F21V 7/0091* (2013.01); *F21V 29/502* (2015.01); *F21V 29/70* (2015.01); *G02B 27/141* (2013.01)

(58) Field of Classification Search
CPC .................................................. F21V 9/30
See application file for complete search history.

(56) References Cited

U.S. PATENT DOCUMENTS

| | | | | |
|---|---|---|---|---|
| 2014/0111776 | A1* | 4/2014 | Yang | F21V 9/40 353/31 |
| 2015/0167907 | A1* | 6/2015 | Hoehmann | G03B 21/204 362/84 |
| 2016/0238203 | A1* | 8/2016 | Lenef | H01S 5/183 |
| 2017/0023188 | A1 | 1/2017 | Mima et al. | |
| 2017/0052362 | A1* | 2/2017 | Chou | G02B 26/008 |
| 2017/0199451 | A1* | 7/2017 | Akiyama | G02B 26/008 |

FOREIGN PATENT DOCUMENTS

| | | |
|---|---|---|
| CN | 101539270 A | 9/2009 |
| DE | 102015101573 A1 | 8/2016 |
| WO | 2015112939 A1 | 7/2015 |
| WO | 2016161557 A1 | 10/2016 |
| WO | WO 2016/161557 * | 10/2016 |

OTHER PUBLICATIONS

International Search Report issued for the corresponding PCT application No. PCT/EP2018/052243, dated May 17, 2018, 4 pages (for informational purpose only).

* cited by examiner

*Primary Examiner* — Yara B Green

(57) ABSTRACT

A laser-activated remote phosphor (LARP) target with a first layer having a first index of refraction and a phosphor dispersed within the first layer. A second layer which has a second index of refraction different from the first index of refraction and adjoins the first layer at an interface. The first index of refraction is higher than the second index of refraction such that the interface is configured to at least partially reflect light emitted from the phosphor.

16 Claims, 3 Drawing Sheets

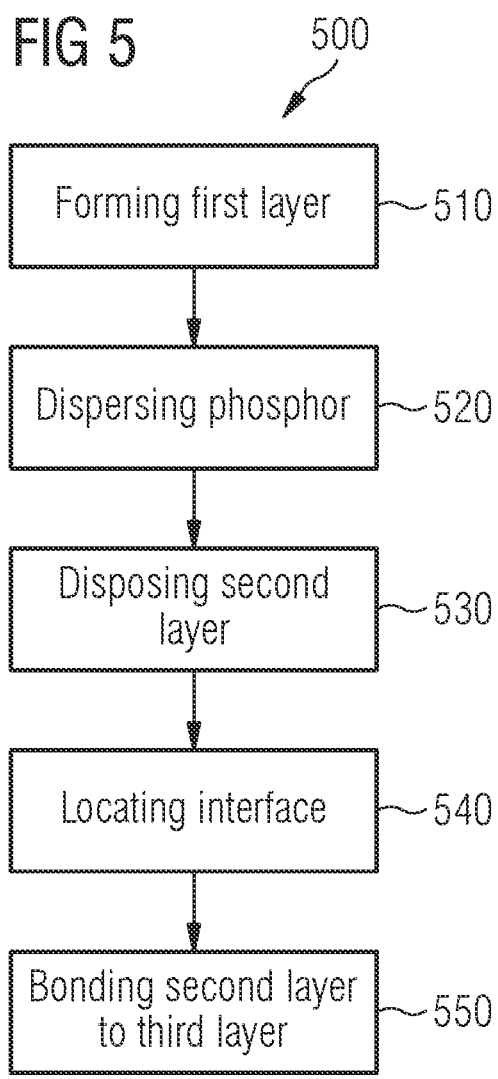

LASER ACTIVATED REMOTE PHOSPHOR TARGET WITH LOW INDEX COATING ON PHOSPHOR, METHOD OF MANUFACTURE AND METHOD FOR RE-DIRECTING EMISSIONS

TECHNICAL FIELD

Various embodiments relate generally to a laser activated remote phosphor with a low index coating on the phosphor, and a method of manufacturing the laser activated remote phosphor and a method for re-directing the light emissions.

BACKGROUND

In current Laser Activated Remote Phosphor (LARP) applications, a phosphor element may be assembled on a transparent substrate such as a heat sink. The phosphor of a LARP target is omni-directional. Accordingly, about 50% of the light may be emitted in an undesired or 'wrong' direction. A mirror such as a dichroic mirror may be positioned to reflect light from the excitation source back in the direction of the phosphor element.

However, not all desired light can be reflected in this manner. Depending on the incident angle of the light on the mirror, a percentage of the misdirected light may not be reflected, and is consequently wasted. In the interface area in-between the phosphor and the transparent heat sink optical filter stacks have been used. The short pass filters may be transparent for the excitation wavelength and reflective for the phosphor emission.

The present state of the LARP target leaves space for improved efficiency of the phosphor target.

BRIEF SUMMARY

Aspects of the disclosure relate to a technical feature which is capable to improve the conversion efficacy of laser-activated remote phosphor (LARP) targets. Aspects of the disclosure are particularly applicable for phosphor targets in transmissive and reflective phosphor configurations.

In particular, aspects of the disclosure describe a dielectric layer or layer target which is introduced on the interface between phosphor and substrate with the purpose to increase the optical efficacy of the phosphor target. Remote phosphor targets in LARP applications are converting light with short wavelength which is used for the excitation into light with longer wavelength. The phosphor target can either be operated in partial-conversion or full-conversion.

The emission of the phosphor may be isotropic, omni-directional, or emit light in a "forward" and "backward" direction. Isotropic emission may be defined for a transmissive phosphor as light which is transmitted in all directions, with the result that an exemplary use for which only light in a single (e.g. forward) direction is used, or considered useful, about 50% of the light produced by the phosphor is emitted in a different, or wrong, direction. For improvement of conversion efficacy, reflecting as much of that light into the forward direction as possible is clearly advantageous.

For a reflective phosphor configuration, the quality of the reflector is essential to reach a high efficacy. Aspects of the instant disclosure may also improve the quality of the reflector in a reflective configuration, adding to efficacy in this manner.

Aspects of this disclosure describe a provision to further enhance the LARP target efficacy. Based on the disclosure, the dielectric target is complemented with a low index layer which is generating total internal reflection (TIR) effects. For transmissive phosphor configuration, this is on the excitation side of the phosphor. For a reflective phosphor configuration, this is on the bottom side of the phosphor which is facing toward the heat sink.

For a transmissive configuration, dielectric targets may be used for recycling the light which is emitted in the half-space of the excitation source. These targets may only be optimized for a limited acceptance angle and a limited bandwidth of the emission spectrum. Therefore, the optical efficacy of this type of dielectric target is limited.

Aspects of this disclosure use a low index layer in combination with the dichroic filter. This low index coating is deposited directly on the phosphor surface. This may allow the enhancement of TIR effects on the interface between the phosphor layer and the low index coating. Light that may try to exit the phosphor under high angles will be reflected back into the phosphor material and cannot propagate further into the target beneath the phosphor. The above described effect is especially effective when a material with high refractive index (bond glass; n=1.95 where n is the refractive index) is used to attach the phosphor on the dichroic filter. In this aspect, simulations are showing a potential gain in the area of 5-6% in optical flux.

The TIR effect for high angles works more efficiently compared to the efficiency of the dichroic filter alone. This results in improved efficacy of the phosphor target.

Further, this limitation of the angular distribution, which needs to be recycled by the dichroic, can advantageously allow improvement of the dichroic. The dichroic may be optimized to a smaller angular distribution which may provide additional efficacy.

The limited angular distribution may also be used for realization of a thinner dichroic. Dielectric targets may act as a barrier layer for heat. The thinner the dielectric target, the more the heat conductivity is improved. If the dielectric target is a member of the de-heating path of the phosphor, it is advantageous for the performance of the phosphor target to keep it as thin as possible. Lower operation temperatures at a given excitation power will provide a better efficacy of the phosphor.

The low index coating my advantageously be realized as a $MgF_2$ layer, where the high thermal conductivity of the material (20-30 W/mK) in combination with a thinner dichroic may be optimized for a beneficial de-heating of the phosphor.

One possible example includes a transmissive configuration with a dichroic mirror on a transparent heat sink (e.g. sapphire). A phosphor platelet with a low index coating on its bottom surface (e.g. $MgF_2$) is adhered to the dichroic mirror with a suitable interface material (e.g. glass, silicone glue, siliconeorganic bond material, water glass, monoaluminumsphosphate/MALP).

Another possible example includes a transmissive configuration with a dichroic mirror on a transparent heat sink (e.g. sapphire). A phosphor platelet with a low index coating on its bottom surface (e.g. $MgF_2$), followed by an adapted dichroic target followed by an encapsulation layer of top of the low index coating (e.g. $SiO_2$, $Al_2O_3$, $Si_3N_4$). The encapsulation layer is adhered to the transparent substrate with a suitable interface material (e.g. glass, silicone glue, siliconeorganic bond material, water glass, monoaluminumsphosphate/MALP).

A different example includes a transmissive configuration without a dichroic mirror on a transparent heat sink (e.g. sapphire). A phosphor platelet with a low index coating on its bottom surface (e.g. $MgF_2$), followed by an adapted dichroic target followed by an encapsulation layer of top of the low index coating (e.g. $SiO_2$, $Al_2O_3$, $Si_3N_4$). The encapsulation layer is adhered to the transparent substrate with a suitable interface material (e.g. glass, silicone glue, siliconeorganic bond material, water glass, monoaluminumsphosphate/MALP).

The disclosure may increase the optical efficacy of the phosphor targets. There are indications of an increase of 3-6% increase in the overall optical flux. Depending on the target design, the thickness of the optical coating may be reduced compared to a target without the low index feature. The reduction in layer thickness may result in improved heat conductivity of the target which may improve the de-heating of the phosphor target.

In accordance with the above, and consistent with aspects of the disclosure, a LARP target may include a first layer having a first index of refraction and a phosphor dispersed within the first layer. A second layer, having a second index of refraction different from the first index of refraction adjoins the first layer providing an interface, wherein the interface is configured to at least partially reflect light emitted from the phosphor. Where the first layer is a light conversion layer, and the first index of refraction is higher than the second index of refraction, a medium boundary may be established at the interface wherein at least a portion of the light emitted toward the interface is reflected in a useful direction due to a total-internal-reflection (TIR) effect.

The target may have a light input surface and a light output surface by which the faces of the target may be designated. For example, the LARP target may have a first major surface and a second major surface opposite the first major surface. In a transmissive configuration, one surface serves as the input for the activating radiation, or excitation radiation such as laser radiation or other source of light. For example, in the blue or ultraviolet portion of the spectrum, the opposite surface serves as the output for converted light, such as white light. Likewise, in a reflective configuration, a single surface may serve as the light input and also as the light output. In such configurations, a reflector may be mounted on or near the opposite surface to the input/output.

In one example, the first layer, in a manner similar to the target, may have an output surface facing the direction of the light emission and an input surface facing the incoming excitation radiation. The second layer may be deposited directly onto the light input surface of the first layer and the second layer may be a low index coating. One possible composition of the low index coating is $MgF_2$.

The LARP target may also include or be formed on a transparent substrate wherein the first layer is disposed on the transparent substrate. The second layer may be disposed between the first layer and the transparent substrate. Further, a third layer between the second layer and the transparent substrate wherein the third layer may be a dichroic mirror. A possible composition of the transparent substrate may be sapphire.

The light is emitted omni-directionally and the third layer is therefore advantageously configured to reflect at least a portion of said light toward the light output surface. The third layer may then advantageously reflect a portion of said light not reflected by the interface. The interface may also be configured to partially reflect said light toward the output. Light emitted at a plurality of angles relative to the interface may be selectively reflected depending upon the angle of the light relative to the interface, i.e. the incident angle of the light, which may be defined relative to a chosen normal angle.

According to further aspects of the disclosure, the light is emitted at a plurality of angles also relative to the third layer. Where a dichroic mirror is the third layer, the third layer may be configured to selectively reflect said light depending upon the angle, or incident angle, of the light relative to the dichroic mirror. In particular, a normal to the interface is in a fixed orientation relative to a normal to the third layer and the normal to the interface is the same as the normal to the third layer.

Notably, the dichroic mirror may be configured to reflect light at angles not reflected by the interface. In this manner, the interface and the dichroic mirror may be considered to act together as a compound reflective arrangement, or as a compound mirror having multiple components or layers, each reflecting light having different characteristics, such as different, but complementary, ranges of incident angles reflected respectively.

Additionally, the dichroic mirror may be embodied as a thin dichroic layer wherein the thin dichroic layer increases a heat conductivity inversely to its thickness and acts as a barrier layer for heat.

In one configuration of the example, the phosphor is configured to convert substantially all of an excitation radiation entering said first layer wherein said conversion is to a different wavelength than that of the excitation radiation. Alternately, the phosphor may be configured to convert a first portion of an excitation radiation to a wavelength different from that of the excitation radiation, and wherein a second portion of said excitation radiation remains unconverted by said phosphor. The first portion and the second portion may combine to create a white light.

According to further aspects of the disclosure, the LARP target may include a bonding layer wherein the bonding layer adjoins the second layer to the dichroic layer. The bonding layer may be a material with a high refractive index. Possible compositions of the bonding layer may include: glass, silicone glue, siliconeorganic bond material, water glass, monoaluminumphosphate.

According to still further aspects of the disclosure, the LARP target further may include a heat sink thermally coupled via a de-heating path to the first layer wherein the de-heating path includes the thin dichroic layer. The de-heating path is such that is allows for a lower operation temperature. It may additionally comprise a low index coating wherein the low index coating has a high thermal conductivity.

According to still further aspects of the disclosure, the LARP target may comprise an encapsulation material at least partially surrounding the first layer and the second layer, and at least one platelet comprising the first layer wherein the first layer is a light conversion layer. The first index of refraction of the first layer may be higher than the second index of refraction of the second layer.

The first layer may have an output surface facing the direction of the exiting light emission and a light input surface facing the direction of the incoming excitation radiation or light. The second layer is advantageously deposited directly onto the light input surface of the first layer.

The second layer may be a low index coating wherein one possible composition of the low index coating is $MgF_2$. The LARP target may further comprise a transparent substrate wherein the first layer is disposed on the transparent substrate and the second layer is disposed between the first layer and the encapsulation material. Additionally, a third layer between the second layer and the encapsulation material may comprise a dichroic mirror. Possible compositions of the encapsulation material include, but are not limited to: $SiO_2$, $Al_2O_3$, $Si_3N_4$.

According to aspects of the disclosure, where light is emitted omni-directionally, the LARP target may be configured such that the third layer is configured to reflect at least a portion of said light. The third layer is further configured to reflect said portion of said light toward the light output surface and reflects a portion of said light not reflected by the interface, which is configured to partially reflect said light toward the output. The light is emitted at a plurality of angles relative to the interface and to the third layer. The interface may be configured to selectively reflect said light depending upon the angle of the light relative to the interface. The dichroic mirror of the third layer is configured to selectively reflect said light depending upon the angle of the light relative to the dichroic mirror.

Accordingly, the LARP target may designate a normal to the interface in a fixed orientation relative to the target. The normal to the interface may be the same as the normal to the third layer. Advantageously, the dichroic mirror may be configured to reflect light at angles not reflected by the interface.

The dichroic mirror may be embodied as a thin dichroic layer and the thin dichroic layer increases a heat conductivity inversely to its thickness. The thin dichroic layer acts as a barrier layer for heat.

In one exemplary configuration, the phosphor is configured to convert substantially all of an excitation radiation entering said first layer wherein said conversion is to a different wavelength than that of the excitation radiation.

In a further exemplary configuration, the phosphor is configured to convert a first portion of an excitation radiation to a wavelength different from that of the excitation radiation. In this configuration, a second portion of said excitation radiation may remain unconverted by said phosphor. It is possible to combine the first portion and the second portion to create a white light.

According to further aspects of the disclosure, the LARP target further includes a bonding layer wherein the bonding layer adjoins the transparent substrate to the encapsulation material wherein the encapsulation material protects the second layer and the third layer from the bonding layer. The bonding layer is a material with a high refractive index. Possible compositions of the bonding layer include, but are not limited to: glass, silicone glue, siliconeorganic bond material, water glass, monoaluminumphosphate.

According to still further aspects of the disclosure, the LARP target may further include a heat sink thermally coupled via a de-heating path to the first layer wherein the de-heating path includes the thin dichroic layer. The de-heating path is such that it allows for a lower operation temperature. It is additionally comprised of the low index coating wherein the low index coating has a high thermal conductivity.

In another example of a LARP target, the first major surface is configured as the light output surface and the light input surface wherein the first layer is a light conversion layer and the first index of refraction is higher than the second index of refraction. The first layer has an output surface facing the direction of the light emission and a light input surface facing the direction of the excitation radiation. The second layer of the LARP target is deposited directly onto a surface opposite the light input surface of the first layer and is embodied as a low index coating. One possible composition of the low index coating is $MgF_2$.

According to a further aspect of the disclosure, the LARP target may further include a substrate wherein the substrate is a heat sink. The first layer may be disposed on the substrate and the second layer is then disposed between the first layer and the substrate. Additionally, a third layer between the second layer and the substrate wherein the third layer may be a metallic layer. The metallic layer is advantageously comprised of a first reflective surface and a second reflective surface. For example, the first reflective surface may be embodied as a dielectric mirror and the second reflective surface may be embodied as a metallic mirror. The first reflective surface may be positioned between the second layer and the second reflective surface. One possible composition of the metallic mirror is silver.

Further aspects of the disclosure describe a LARP target wherein said light is emitted at a plurality of angles. The light is emitted at a plurality of angles relative to the interface and to the third layer wherein the interface is configured to selectively reflect said light depending upon the angle of the light relative to the interface. The third layer is configured to reflect at least a portion of said light emitted toward the light output surface reflection a portion of said light not reflected by the interface. The interface is configured to partially reflect said light toward the light output surface. The metallic layer is configured to selectively reflect said light depending upon the angle of the light relative to the metallic layer wherein the metallic layer is configured to reflect light at angles not reflected by the interface. A normal to the interface is in a fixed orientation relative to a normal to the third layer wherein the normal to the interface is the same as the normal to the third layer.

In one configuration of the example, the phosphor is configured to convert substantially all of an excitation radiation entering said first layer wherein said conversion is to a different wavelength than that of the excitation radiation.

In another configuration, the phosphor is configured to convert a first portion of an excitation radiation to a wavelength different from that of the excitation radiation, and wherein a second portion of said excitation radiation remains unconverted by said phosphor wherein it is possible for the first portion and the second portion to combine to create a white light.

The LARP target further comprises a bonding layer wherein the bonding layer adjoins the metallic layer to the substrate. Some possible bonding compositions include a solder interface or a sinter interface.

A method for selectively redirecting laser activated remote phosphor emissions may be comprised of activating a phosphor dispersed within a first layer of a LARP target to emit a converted light; directing at least a first portion of the converted light onto an interface between the first layer and a second layer; and reflecting at least a second portion of the first portion of the converted light using the interface to redirect the second portion; wherein the first layer is formed of a material having a first index of refraction, and the second layer is formed of a material having a second index of refraction.

Further, the method may include directing a third portion of the first portion of the converted light onto a third layer, wherein the third layer comprises a dichroic surface; reflecting a fourth portion of the third portion of the first portion of the converted light using the dichroic mirror to redirect the fourth portion.

Another method may include the method of manufacturing a laser activated remote phosphor (LARP) target including forming a first layer of a material having a first index of refraction; dispersing a phosphor within the first layer; disposing a second layer of a material having a second index of refraction on a major surface of the first layer; locating an interface between the first layer and the second layer adjacent to at least a portion of the phosphor; wherein converted light emitted via excitation of the phosphor is directed at least partially onto the interface; and wherein at least a portion of the light directed onto the interface is redirected by reflection at the interface.

Additionally, the method of manufacturing the LARP target may include bonding the second layer to a third layer, the third layer comprising a dichroic mirror, wherein the dichroic mirror is oriented to reflect at least a portion of the light directed onto the interface.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5 shows a method for manufacturing a LARP target.

DETAILED DESCRIPTION

Figure 1:
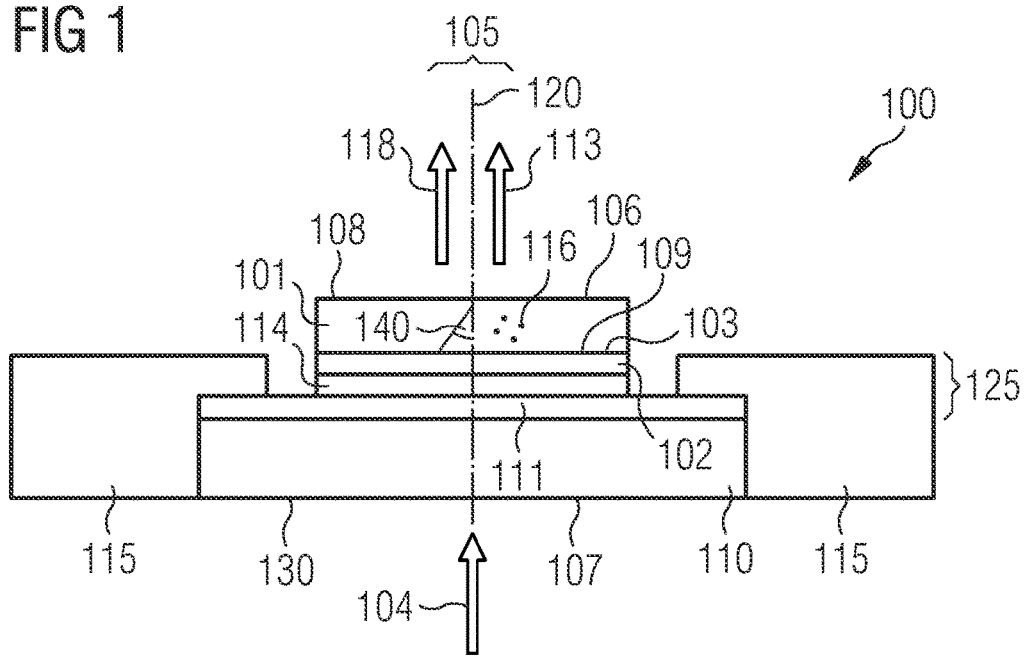
FIG. 1 shows a transmissive phosphor target with a low index coating on a light conversion layer.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "plural" and "multiple" are used herein to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., are used herein to mean a quantity equal to or greater than one, i.e. one or more. Accordingly, the phrases "a group of [objects]", "a set of [objects]", "a collection of [objects]", "a selection of [objects]", "[object] group, "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]", "three of the [objects]", "ten or more [objects]", "at least four [objects]", etc.) or express use of the words "plural", "multiple", or similar phrases, references to quantities of objects are intended to refer to one or more of said objects.

A laser activated remote phosphor (LARP) target may alternatively be referred to as a LARP target or LARP assembly. The terms may be used interchangeably.

Full-conversion is defined as a configuration in which all or almost all of the light which is used for excitation is converted. Partial-conversion is defined as a configuration in which only a portion of the light which is used for the excitation is converted—the remaining light is transmitted unconverted (although possibly scattered).

Forward direction is defined as the direction in which light exits through a major surface of the LARP target. The forward direction may be referred to the direction towards the light emission or the "top" of the LARP target. The forward direction may also be referred to as the "correct" or "desired" direction.

Backward direction is defined as the direction in which light travels through the LARP target through a major surface. The backward direction may be referred to the direction towards the "bottom" of the LARP target. The backward direction may also be referred to as the "wrong" or "undesired" direction.

Isotropic emission is defined as light which is transmitted in all directions.

Total internal reflection (TIR) is defined as the phenomenon which occurs when a propagated wave, in this disclosure it may be a light wave, strikes a medium boundary, or interface, at an angle larger than a particular critical angle with respect to the normal to the surface. If the refractive index is lower on the other side of the boundary and the incident angle is greater than the critical angle, the wave cannot pass through and is entirely reflected. The critical angle is the angle of incidence above which TIR occurs.

When a wave reaches a boundary between the materials with different refractive indices, the wave will in general, be partially refracted at the interface surface, and partially reflected. However, if the angle of incidence is greater (i.e. the direction of propagation is closer to being parallel to the boundary) than the critical angle—the angle of incidence at which light is refracted such that it travels along the boundary—then the wave will not cross the boundary, but will instead be totally reflected back internally. This can only occur when the wave in a medium with a higher refractive index reaches an interface with a medium of lower refractive index.

Surrounding is a term meaning all around an object. To partially surround may mean, on a multi-surface object, only one surface is covered or overlaid; or it may mean all but one surface is covered, surrounded or overlaid or all but one partial surface is covered, surrounded or overlaid or a single partial surface is covered or overlaid, or multiple surfaces are covered or overlaid while multiple surfaces remain uncovered.

A laser-activated remote phosphor (LARP) target 100 is shown in FIG. 1. In particular, LARP target 100 is illustrated as a progression of layers formed on substrate 110. Shown at the top of the illustration, i.e., farthest from the substrate, first layer 101 may have phosphor 116 dispersed within it. The first layer is, advantageously, at least partially transparent, translucent or transmissive to light, such that excitation light 104 entering first layer 101 may pass into the layer, either striking phosphor 116, or, according to at least one aspect of this disclosure, passing through first layer 110 without interaction with the phosphor. Where excitation light 104 strikes phosphor 116, the phosphor is typically activated (i.e., excited), that is phosphor 116 emits light of a different wavelength 113 when light, or excitation radiation 104, strikes phosphor 116. Excitation radiation 104 may therefore alternately be referred to as light, activating radiation, or excitation light.

Likewise, as shown in FIG. 1, where excitation radiation 104 exits first layer 101 without activating phosphor 116, excitation radiation 104 may exit as unconverted light 118. Typically, and according to at least one aspect of the disclosure, unconverted light 118 has the same, or has similar characteristics to excitation radiation 104. That is, unconverted light 118, having avoided conversion via interaction with phosphor 116, may have the same wavelength and/or spectral characteristics to those of excitation radiation 104. As shown, unconverted light 118 may be emitted together with converted light 113, resulting, advantageously, in mixed output light 105. For example, where excitation radiation 104 is in the blue light spectrum, conversion of a fraction of excitation radiation 104 to yellow light via appropriate choice of phosphor 116, combination of yellow converted light 113 with blue (i.e. unconverted) light 118 can provide white emission light 105.

In addition to the above features, first layer 101 is composed of material having a specific index of refraction. As such, the material in which phosphor 116 is dispersed may be chosen for a range of properties which, according to at least one aspect of the disclosure, includes the refractive index of the material. As a result, the index of refraction of layer 101 as a whole is advantageously known and/or selected to have a specific value according to the above aspect of the disclosure.

First layer 101 may be secured to converter assembly, or converter target, by an adhesive or similar layer such as bonding layer 114. Advantageously, however, a second layer 102 may be disposed between bonding layer 114 and first layer 101. Second layer 102 may be directly applied to first layer 101. In particular, second layer 102 may be applied as a coating to first layer 101, whereupon first layer 101 is secured to target 100 by bonding layer 114 via second layer 102.

Where second layer 102 has a second index of refraction different from the first index of refraction of first layer 101, an interface 103 is established. Advantageously, interface 103 may function as a boundary layer between two materials of different indexes of refraction. Depending on the respective configurations of first layer 101 and second layer 102, interface 103 may have specific optical properties, for example, interface 103 may be configured to at least partially reflect light emitted from the phosphor 116 toward second layer 102 at interface 103.

It may be advantageous, according to an aspect of the disclosure for LARP target 100 to have a first major surface 106 and a second major surface 107 opposite the first major surface 106. The first major surface 106 is shown at the top and the second major surface 107 is illustrated at the bottom of LARP target 100. However, where major surfaces are employed, the major surfaces may be any major sides having any orientation, including opposite from each other.

More particularly, FIG. 1 shows an embodiment consisting of a transmissive configuration, wherein the first major surface 106 is configured to emit light emissions 105 from the light output surface 108 and the second major surface 107 is configured to receive excitation light 104 onto the light excitation input surface 130. In other words, light excitation input surface 130 serves as the input for excitation light 104 of LARP target 100, whereas surface 106 serves as its output 108 according to the aspect of the disclosure illustrated in FIG. 1. The excitation light or excitation radiation 104 therefore enters the target 100 through the bottom and the emission of light exits through the top of the LARP target 100, constituting a transmissive LARP target.

First layer 101 may also be designated as a light conversion layer 101. As noted above, the light conversion layer 101 is a layer in which the phosphor 116 is dispersed and at least a portion of the excitation radiation 104 is converted to a different wavelength 113. Phosphor 116 may be dispersed in a loose particle like fashion or may be embodied as a platelet. Phosphor 116 may be suspended in glass or silicone, however it may also include ceramics and phosphor powder in inorganic and organic materials by way of example.

Advantageously, the first index of refraction is higher than the second index of refraction. When the first index of refraction is higher than the second index of refraction a phenomenon known as total internal reflection may occur. According to this phenomenon, where the is lower, for example, in second layer 102 than in first layer 101, and light, such as light emitted from phosphors 116 suspended in first layer 101 that approaches second layer 102 from the first layer 101 at an incident angle 140 greater than the critical angle of the first and second 102 layers, the wave cannot pass through and is at interface 103. When a light wave reaches a boundary between different materials with specified differences in refractive indices, the wave may be expected to be reflected at the interface 103 depending on its incident angle 140.

According to an aspect of the disclosure, first layer 101 may have a designated light output surface 108 facing the direction of the light emission 105 and a light input surface 109 facing the direction of the incoming light emission 104. In a transmissive configuration, light conversion layer 101 has a "top" surface and a "bottom" surface. The "bottom" surface, or the light input surface 109, of the light conversion layer 101 faces the incoming excitation radiation 104. The "top" surface, or the light output surface 108, faces in the direction that the light exits the light conversion layer or light emission 105. In other words, the light enters from the bottom of the target 100 and exits from the top. In this configuration, first major surface 106 may serve as light output surface 108, where first layer 101 is at the top of target 100.

According to a further aspect of the disclosure, and as mentioned above, second layer 102 may be deposited directly onto first layer 101. As shown, second layer 102 is applied directly to light input surface 109 of the first layer 101. Advantageously, an intermediary bonding layer between first layer 101 and second layer 102 may be avoided. In particular, second layer 102 may be composed of a material that can be directly applied to light input surface 109 of first layer 101, e.g. the bottom side of the light conversion layer.

Second layer 102 may be a low index coating. Second layer 102 may be composed of a material that can be coated onto the light conversion layer 101. Advantageously, it is composed of a material such that it has a low index of refraction, or has an index of refraction at least lower than the index of refraction of the light conversion layer 101. In one configuration of low index coating applied as layer 102, the low index coating is composed of $MgF_2$. $MgF_2$ is particularly advantageous as it has a high thermal conductivity (20-30 W/mK). Because of this feature, the target 100 can be optimized for a favorable de-heating of the phosphor 116.

LARP target 100 may advantageously be formed on a rigid substrate. For transmissive configurations, substrate 110 may be transparent. The ability of light, particularly light in wavelengths suitable for excitation of the phosphor chosen as phosphor 116, to pass through the substrate is a component of transmissive embodiments. Transmissive configurations may include translucent, or partially transparent materials. One or more wavelengths may be filtered out by the substrate without deviating from this definition. Additionally, light may selectively propagate through substrate 110. For example, light may be admitted from one surface of the substrate, but reflected from another. Transmissive configurations therefore advantageously include a substrate 110 such that light 104 or relevant radiation may propagate through it and into one or more layers of target 100.

As described above, FIG. 1 discloses first layer 101 disposed on the transparent substrate 110. Second layer 102 may be disposed between first layer 101 and transparent substrate 110. Where second layer 102, is part of or formed on the bottom side of first layer/light conversion layer 101, it may be said to be positioned between the light conversion layer and the transparent substrate 110.

LARP target 100 may advantageously include a further, third layer 111, for example, between the second layer 102 and the transparent substrate 110. Third layer 111 is shown positioned between low index coating 102, which has, for example, been applied to the light conversion layer 101, and the substrate 110. Third layer 111 may be reflective, or partially reflective. Where third layer 111 is a dichroic surface, it may pass light of a first wavelength without reflection, and may reflect light of a second wavelength. Advantageously, third layer 111 may be a dichroic mirror, or dichroic coating on substrate 110 wherein the dichroic features permit light having the wavelength of excitation light 104 to pass essentially unaffected. Thus, light entering at second major surface 107 (i.e. the input) of LARP target 100 may pass through third layer 111 and there through pass into the layers above. Ideally, third layer 111, when embodied as a dichroic mirror, attenuates the incoming excitation radiation 104 as little as possible, preferably negligibly, or not at all.

As an additional feature, third layer 111 is embodied as a dichroic mirror configured to reflect light at the wavelength of converted light 113. Thus, light having the converted wavelength 113 is reflected by third layer 111. In view of the position of third layer 111 relative to first layer 101, converted light emitted toward the third layer, such as from excitation of phosphor 116, may be reflected. This is advantageous where the reflected light may be redirected into converted light emission 113, rather than being wasted. Taken together, the features of third layer 111, when configured as a dichroic mirror permit recapture of lost light without reduction in the transmissiveness of LARP target 100 to excitation radiation 104.

The addition of third layer 111 is especially advantageous where the converted light 113 may be emitted isotropically, in the forward and the backward direction or omni-directionally from phosphor 116. In particular, where excitation radiation 104 that reaches the phosphor 116 is converted and emitted in all directions and at all angles from the light conversion layer, some light is emitted in the direction of the light output surface 108 and some is emitted back in the direction of the light excitation input surface 130, or from the direction that the excitation radiation entered the target 100.

Accordingly, wherein the third layer 111 is configured to reflect at least a portion of said light. The interface 103 between the first 101 and the second layer 102 will reflect a portion of the light emitted by the phosphor 116, but only at those angles where the incident angle 140 is greater than the critical angle. However, angles less than the critical angle are transmitted through the second layer 102. The third layer 111 may be designed such that it reflects those angles that are not reflected at interface 103, but instead pass through the second layer 102.

Accordingly, interface 103 and third layer 111 may be configured to have reflective characteristics that complement each other in operation of LARP target 100. Where third layer 111 is configured to preferentially reflect that portion of converted light not reflected by the interface 103, a greater portion of total converted light can be recovered/redirected toward first major surface 106 of LARP target 100, which serves as its output. The reflectivity of a specific range of angles provided by interface 103 reduces the range of angles of light that may pass through interface 103 unreflected. Thus, light may be incident on third layer 111 in a more narrowly concentrated distribution of angles. This increases the efficiency of LARP target 100 at least by allowing a narrower range of reflectivity in the dichroic layer to be effectively employed as third layer 111, which allows for greater reflective efficiency at the smaller range of angles.

Incident angle 140 may be measured according to a deviation from an established normal orientation. As shown in FIG. 1, a normal orientation is shown as normal 120, which in this illustration is selected perpendicular to the major surfaces 107 and/or 106 of LARP target 100.

Typically, light is emitted at a plurality of angles relative to normal 120. More particularly, light that is emitted by phosphor 116 may be emitted in a forward and backward direction or omni-directionally at a plurality of angles relative to normal 120. If first layer 101 with phosphor 116 and its bounding surface have low scattering, the emission may be isotropic. In more typical applications, first layer 101, or light conversion layer contains many scattering particles dispersed throughout the volume. The changes in the light distribution inside first layer 101 with phosphor 116 approaches a Lambertian distribution in the forward and backward directions. The angles that reach the interface 103 are therefore comprised of both low and high incident angles 140.

Depending on the configuration of the first layer 101 and second layer 102, i.e. depending at least in part on the respective refractive indexes of the layers, interface 103 is configured to selectively reflect light depending upon the angle of the light relative to normal 120. The materials used for the first layer 101 and the second layer 102 may be chosen such that a specific range of such angles are reflected by interface 103. Similarly, light may 'escape' reflection by interface 103, with the result that light is passed through second layer 102 to the third layer 111 at a variety or plurality of incident angles 140. The dichroic mirror of the third layer 111 may thus be configured to selectively reflect said light depending upon the expected angle of the light relative to normal 120 incident upon the dichroic mirror surface of third layer 111. The dichroic mirror reflects the light transmitted through the second layer 102 at those angles not reflected by the interface 103. A specific range of angles passed through the second layer 102 and is reflected by the dichroic mirror 111.

Notably, interface 103 does not reflect light reflected from the direction of third layer 111 toward first layer 101 in the same manner as light approaching from the opposite direction. This is due to the inherent property of interface 103 which is dependent upon a refractive gradient going from lower in the second layer to higher in the first layer, which is not typically subject to the phenomenon of TIR. Interfaces bound by regions of different refractive indices have Fresnel reflections, i.e., a partial reflection that increases with refractive index difference and angle of incidence. In the case of going from high to low index, as with interface 103, the reflectivity may go from a small normal incidence reflectance to total reflection when you reach the critical angle, or TIR. Thus, light moving from input to output in LARP target 100 is not significantly attenuated by interface 103.

According to an aspect of the disclosure, all surfaces of all layers may be generally parallel to each other with the result that normal 120 to the interface 103 is the same normal 120 to the third layer 111. As such, the orientation of the first, second and third layer 111 are such that they have the same axis perpendicular, or normal 120, to the plane that they lie in.

According to an embodiment transparent substrate 110 may be composed of sapphire. Further, the dichroic mirror at third layer 111 may be a thin dichroic layer (≤3.5 microns). The limited angular distribution that is required in the dichroic can result in the realization of a thinner dichroic layer than would be required to reflect light in a wider range of incident angles 140. Because interface 103 essentially filters out a range of angles the dichroic may advantageously be designed without regard to the possibility of light incident at the filtered range.

Thin dichroic layer 111 may increase heat conductivity such that the thinner the dichroic layer the more improved the heat conductivity of the LARP target 100. By reducing the thickness of the dichroic layer 111, an increase of heat conductivity may occur. If the dielectric target 100 is a member of the de-heating path of the phosphor 116 it is advantageous for the performance of the phosphor target 100 to have a thin dichroic layer 111. Lower operation temperatures at given excitation power will provide a better efficacy of the phosphor 116. Further, thin dichroic layer 111, along with second layer 102, may aid in the reduction of the heat by acting as a barrier to the heat from the excitation radiation 104. In one embodiment of LARP target 100 the low index coating is realized as $MgF_2$. The high thermal conductivity of $MgF_2$, combined with the thinner dichroic layer 111 is advantageous for de-heating phosphor 116.

According to one configuration, the phosphor 116 may be embodied such that it may convert substantially all of excitation radiation 104 entering first layer 101 to converted light 113 of a different wavelength. In this case, excitation radiation 104 strikes the phosphor 116, which may be realized as a platelet or thickly dispersed phosphor particles. Excitation radiation 104 may be entirely converted to output light 113 of a different wavelength with nearly no light of the same wavelength of the excitation radiation 104 remains unconverted.

In a different configuration, phosphor 116, which may be realized as less strongly absorbing phosphor 116 at the excitation radiation light input 104 wavelength within a light conversion layer 101, which may be produced by lowering the activator ion concentration, reducing scattering, platelet thickness, lower phosphor powder loading, and other techniques known in the art to generate a partially converting phosphor. Phosphor 116 may 116 be embodied such that it may convert a first portion of converted light emission 113 is converted to a different wavelength by phosphor 116, and wherein a second portion of unconverted light 118 remains unconverted by phosphor 116. Combined light emission 105 that is emitted from first layer 101 may contain two different wavelengths: the wavelength of the unconverted light 118 and converted light 113 converted to a different wavelength by phosphor 116. As previously mentioned, unconverted light 118 may be emitted together with converted light 113, resulting, advantageously in mixed emitted light 105. For example, where excitation radiation 104 is in the blue light spectrum, conversion of a fraction of excitation radiation 104 to yellow light via appropriate choice of phosphor 116, combination of yellow converted light 113 with blue (i.e. unconverted) light 118 can provide white emitted light 105.

In addition to the above features, a bonding layer 114 adjoins, fixes or adheres second layer 102 to third layer 111. Advantageously, the bonding layer 114 may be comprised of a material with a high refractive index. One example of a material that may be considered for bonding layer 114 is glass, where the glass has a high refractive index of n=1.95. Other possible materials for bonding material 114 may include silicone glue, siliconeorganic bond material, water glass and monoaluminumphosphate.

It may be advantageous for bonding layer 114 material to have a higher index of refraction than the second layer 102 allowing the light to pass through bonding layer 114 to the third layer 111 with limited reflection at the surface of bonding layer 114.

To further aid in de-heating LARP target 100, a heat sink 115 may be thermally coupled LARP target 100. Heat sink 115 is coupled to the target 100 in a manner that allows for optimal heat reduction. A de-heating path 125 may be advantageously created such that lower LARP target 100 operation temperatures may be achieved. The de-heating path 125 may be comprised of thin dichroic layer 111, which has been discussed above, low index material 102 comprised of a high thermally conductive material and heat sink 115 to further reduce the heat from phosphor 116. The overall heat of phosphor 116 may be reduced to allow for a more efficient LARP target 100.

Figure 2:
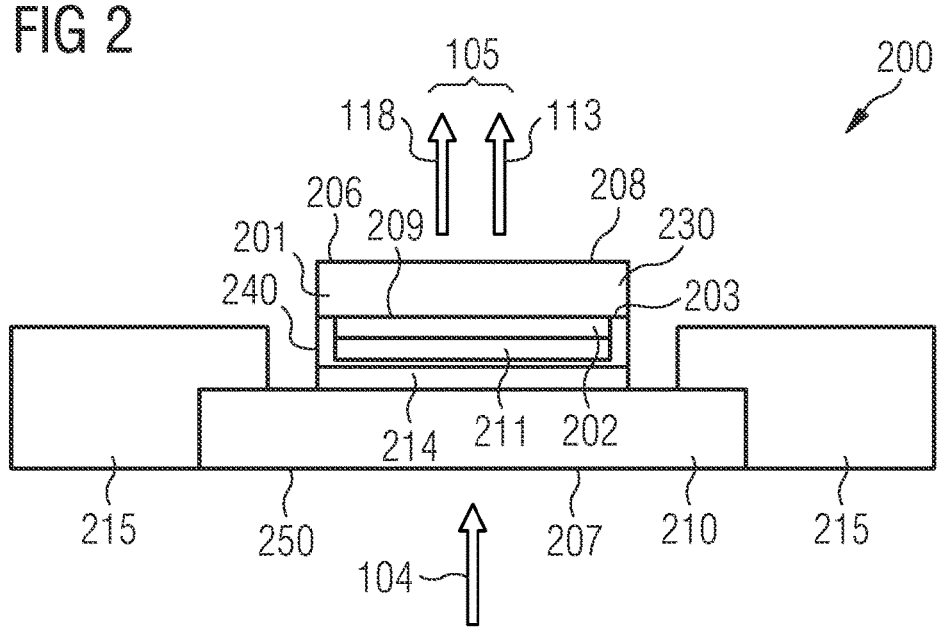
FIG. 2 shows a transmissive phosphor target with a low index coating on a light conversion layer including an encapsulation material.

A LARP target 200 is shown in FIG. 2. In particular, LARP target 200 is shown, as with FIG. 1, as a progression of layers formed on substrate 210, similarly described as substrate 110 above. Shown at the top of the illustration, i.e., farthest from the substrate, first layer 201. First layer 201 may be as described in first layer 101, or alternatively, may also be comprised of a layer of a continuous phosphor material, or phosphor platelet 230. Typical dimensions of phosphor platelets are between 0.25-5 mm in diameter and 25-300 microns thick. In general, the phosphor material may be a ceramic or a phosphor powder in glass. However, they may also be found as phosphor powder in silicone. The phosphor platelet 230 may be realized as a prefabricated platelet. In. In other embodiments, the phosphor platelet may be applied as a layer using deposition methods. Where excitation radiation 104 strikes phosphor platelet 230, exciting phosphor platelet 230, that is, phosphor platelet 230 emits light of a different wavelength 113 when light 104 strikes phosphor platelet 230.

First layer 201 may be secured to target 200 by an adhesive or similar layer such as bonding layer 214. As with LARP target 100, the second layer 202 may be applied to first layer 201 in a similar manner as second layer 102 to first layer 101, thus creating the same interface 203 as found in interface 103.

Additionally, LARP target 200 may comprise encapsulation material 240 which advantageously may at least partially surround the first layer 201 and the second layer 202, which may be similarly described as in second layer 102. An encapsulation material 240 may surround at least the third layer 211, which is similar in composition and features to third layer 111, but encapsulation material 240 may also include second layer 202 in the enclosure, covering or shield. However, encapsulation material 240 need not encapsulate second layer 202. It may be embodied as a thin film layer without covering the sides of second layer 202, or the low index coating, between bonding layer 214 and third layer 211. The benefit of the encapsulation material 240 is to provide protection to third layer 211 and/or second layer 201 from the process of bonding to substrate 210. By encapsulating third layer 211 and second layer 202, similar to second layer 101 described above, damage to the layers may be reduced by eliminating possible chemical and mechanical impairment to the layers. Instead, the encapsulation material 240 is bonded to substrate 210 by means of a bonding layer 214, similar to bonding layer 114, thereby avoiding direct contact with second layer 202 and third layer 211.

According to an aspect of the disclosure, first layer 201 may have a designated light output surface 208 facing in the direction of light emission 105 and a light input surface 209 facing the light excitation input surface 250, where light excitation input surface 250 faces incoming excitation radiation 104, where light output surface 208 and light input surface 209 are analogous to light output surface 108 and light input surface 109, having coinciding transmissive features as LARP target 100.

According to one aspect of the disclosure, second layer 202 may be disposed between first layer 201 and encapsulation material 240. Where second layer 202 is part of or formed on the bottom side of first layer 201, it may be said to be positioned between the first layer 201 and the encapsulation material 240. The second layer 202 is deposited on the first layer 201 positioned between the first layer 201 and the encapsulation material 240. The layers 201, 202 are positioned over the transparent substrate. The encapsulation material 240 may be advantageously deposited upon second layer 202 via optical thin film coating methods, i.e., evaporation, sputtering, ion-assisted evaporation, CVD, MOCVD, PLD, etc. It may also be applied, by way of further examples, via chemical solution methods or spin coating of sol-gels.

LARP target 200 may advantageously include further third layer 211 between second layer 202 and encapsulation material 240. Third layer 211 is shown positioned between the low index coating 202 and the encapsulation material 240, which has been applied to the first layer 201, and the substrate 210. The encapsulation material may be composed of, but not limited to, by way of example, $SiO_2$, $Al_2O_3$, $Si_3N_4$. The encapsulation material may advantageously have a good adhesion to second layer 202, or the low index coating, and bonding layer 214; be chemically inert to bonding layer 214; and prevent diffusion of bonding layer 214 to second layer 202 thereby preventing any reaction with bonding layer 214. The encapsulation material may advantageously have an index of refraction closer to the index of second layer 202.

Accordingly, interface 203 and third layer 211 may be configured to have reflective characteristics that complement each other in operation of LARP target 200, which is similar to the relationship between interface 103 and third layer 111 explained in greater detail above.

Further, LARP target 200 may include bonding layer 214 wherein the bonding layer 214 adjoins, fixes or adheres the transparent substrate 210 to the encapsulation material 240. The encapsulation material 240 is designed such that it may be bonded to the transparent substrate 210 with a bonding material. Bonding layer 214 may consist of similar properties as bonding layer 114.

In addition to having maximal index contrast between first layer 101, 201 (the phosphor having a high refractive index), and second layer 102, 202 (the low index layer having a lower refractive index), the thickness of the low index layer may function as an anti-reflection layer for excitation radiation 104. In particular, if no encapsulation layer 240 is used, then a simple half-wave layer can be used; thus the thickness of a single low index layer would be given by, $$d_L = \frac{m\lambda_0}{2n_L}, m = 1, 2, 3, \ldots \quad (1)$$

Here, $d_L$ is the thickness of the low index layer, such as a $MgF_2$ layer, $\lambda_0$ is the free-space wavelength of excitation radiation 104, and $n_L$ is the refractive index of the low index layer. For the case of $MgF_2$ with excitation radiation 104 at 450 nm, $n_L$=approximately 1.39. Equation (1) then gives low index layer thicknesses of 162 nm, 324 nm, and 486 nm, for m=1, 2, 3. Generally thicknesses much less than one wavelength (in the medium for the yellow or converted light) result in some evanescent leakage through the low index layer for incident light, reducing the TIR effect. Therefore, the thicknesses for m=2 or m=3 are advantageous, but m≥3, may degrade thermal conductivity. In the case of a second encapsulation layer, Equation (1) may not be accurate enough. In that case, a multi-layer simulation may be advantageously used to determine an optimal low index and encapsulation layer thickness that provides good anti-reflection properties for excitation radiation 104.

Figure 3:
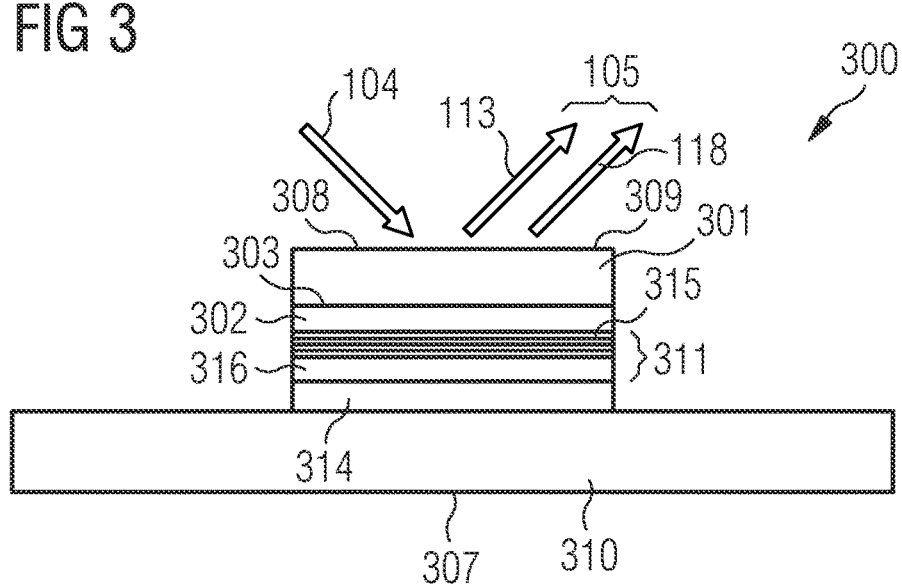
FIG. 3 shows a reflective phosphor target with a low index coating on a light conversion layer.

LARP target 300 is shown in FIG. 3. As with the previously described targets target, LARP target 300 is shown as a progression of layers formed on a substrate 310. Shown at the top of the illustration, i.e., farthest from the substrate, is first layer 301. First layer 301 and phosphor 316 may be comparable to first layer 101, 201 and phosphor 116. 230. The interface 303 may be established in the same manner as interface 103, 203 along with the applicable description of the indexes of refraction between first layer 101 and second layer 102.

Second layer 302 may be disposed between first layer 301 and substrate 310. Where second layer 302, is part of or formed on the bottom side of first layer 301.

LARP target 300 may advantageously include a further third layer 311, for example, between the second layer 302 and the substrate 310. Third layer 311 is shown positioned between second layer 302, which has for example, been applied to the first layer 301, and the substrate 310. The third layer 311 may be bonded to substrate 310 by means of bonding layer 314.

It may be advantageous, according to an aspect of the disclosure for LARP target 300 to have a first major surface 306. First major surface 306 is shown at the top of LARP target 300 similar to first major surface 106.

More particularly, FIG. 3 shows an embodiment consisting of a reflective configuration, wherein the first major surface 306 is configured to emit light emission 105 as well as receive excitation radiation 104. In other words, surface 308 serves as the light input for excitation radiation 104 of the LARP target 300 as well as the light output surface for light emission 105 according to the aspect of the disclosure illustrated in FIG. 3. LARP target 300 is activated by the excitation radiation on the same major surface as the light which is emitted 105 from the target 300. Both the excitation radiation 104 and the light emission 105 enter and exit the target from the same side of the target 300.

LARP target 300 may also be formed on a rigid substrate. For reflective configurations, substrate 310 need not be transparent. However, it is advantageous for substrate 310 to be a heat sink. Substrate 310 may aid in the reduction of heat, or de-heating, of the operational phosphor 316.

Additionally, LARP target 300 may advantageously include a further, third layer 311, for example, between second layer 302 and substrate 310. Third layer 311 is shown positioned between substrate 310 and second layer 302, which has, for example, been applied to first layer 301 and substrate 310. Third layer 311 may be reflective, or partially reflective where third layer 311 may be comprised of a metallic layer which may further be comprised of several layers within the metallic layer 311. Metallic layer 311 may consist of first reflective surface 315, which one possible configuration may be a dielectric mirror, and second reflective surface 316, which one possible configuration may be a metallic mirror. This hybrid mirror, which is a combination of first reflective surface 315 and second reflective surface 316 may be used to avoid surface roughness and scattering within LARP target 300. First reflective surface 315 may be positioned between the second layer 302 and the second reflective surface 316. To increase the reflectiveness of metallic mirror 316 the first reflective surface 315 may be placed on the top side of second reflective surface 316. Advantageously, the second reflective surface 316 may be composed of silver.

Third layer 311 is configured to reflect at least a portion of the light in a manner similar to that described above for third layer 111.

In addition to the above features, a bonding layer 314 adjoins, fixes or adheres metallic layer 311 to the substrate 310. Possible bonding materials include a solder interface or a sinter interface.

Figure 4:
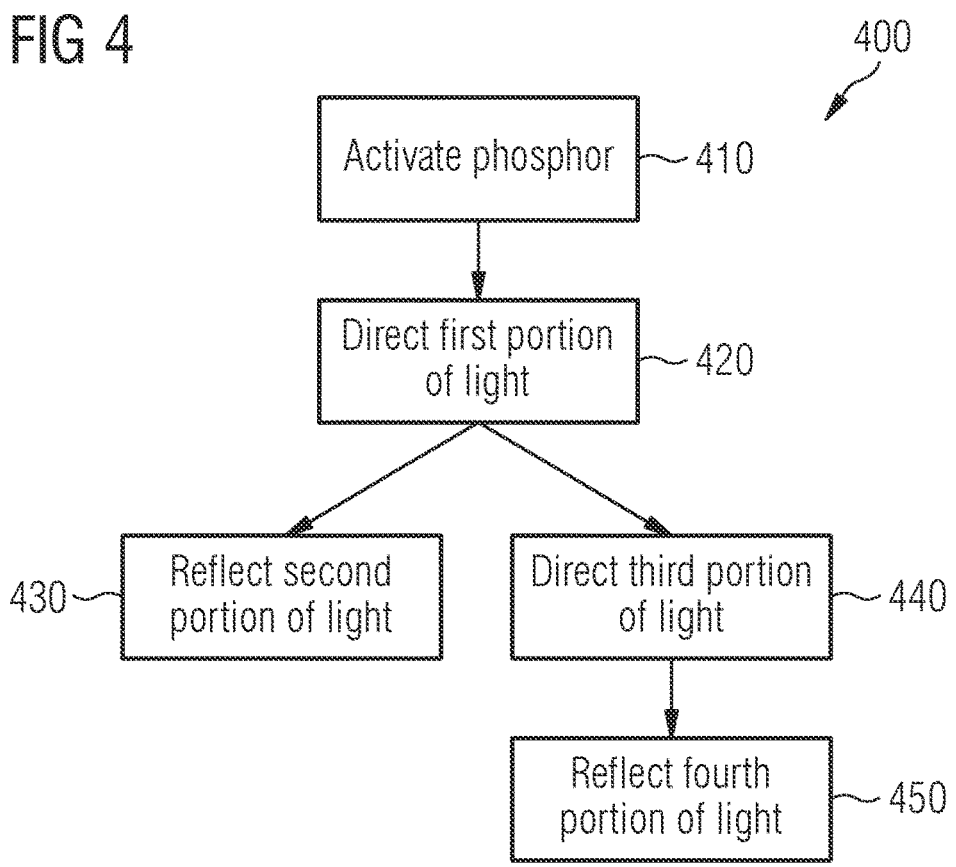
FIG. 4 shows a method for selectively redirecting phosphor light emissions.

FIG. 4 shows a method for selectively redirecting LARP emissions within the LARP target. A phosphor 116, dispersed within a first layer of LARP target 100, may be activated 410 using an activation source such as a laser. When activated 410, the phosphor 116 may emit a light which has been converted to a different wavelength as described above. A first portion of the light may be at least partially directed 420 onto interface 103 between first layer 101 and second layer 102. Additionally, a second portion of light may be reflected 430 using the interface. The second portion of light may be described as being a part the first portion of light that was initially converted, or activated 410 by the phosphor. As described above, for instance in FIG. 1, the first layer 101 has a first index of refraction and the second layer may have a second index of refraction. Advantageously, the first index of refraction may be higher than the second index of refraction.

Additionally, the first portion of light may also have a third portion which is directed toward the third layer 440. Again, as mentioned above, the third layer may be third layer 111, 211, 311 from any of the above configurations and examples. The dichroic mirror may reflect a forth portion of light 450 which may originate from the third portion of light which was directed 440 toward the dichroic mirror.

FIG. 5 shows a method for the manufacturing a LARP target where the first layer is formed 510 and a phosphor is dispersed within the layer 520. The phosphor may be loosely packed particles or a platelet or any other formation in-between. A second layer is disposed 530 or coated onto the first layer as structurally described above. The materials may be chosen such that the first layer may advantageously have a higher index of refraction than the second layer. The interface may be located 540 allowing for optimal light distribution and the converted light may be at least partially directed in the direction of the interface. The light which reaches the interface may then at least partially be reflected by the interface back toward the first layer.

Additionally, it may be necessary to bond the second layer to the third layer 550. By fixing the first and second layer it may assist in the stability of the LARP target and provide means of maintaining a constant normal between the layers.

While the disclosed embodiments have been particularly shown and described with reference to specific embodiments, it should be understood by those skilled in the art various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

What is claimed is:

1. A laser-activated remote phosphor (LARP) target comprising:
   a first layer having a first index of refraction;
   a phosphor dispersed within the first layer;
   a second layer, having a second index of refraction different from the first index of refraction adjoining the first layer at an interface;
   a first major surface and a second major surface opposite the first major surface, wherein the first major surface is configured as a light output surface and the second major surface is configured as a light excitation input surface;
   wherein the first index of refraction is higher than the second index of refraction;
   wherein the interface is configured to at least partially reflect light emitted from the phosphor;
   wherein the light is emitted at a plurality of angles relative to the interface and wherein the interface is configured to selectively reflect the light toward the light output surface depending upon the angle of the light relative to the interface.

2. The LARP target of claim 1, wherein the second layer is deposited directly onto a light input surface of the first layer, wherein the light input surface of the first layer is facing toward the light excitation input surface.

3. The LARP target of claim 1, further comprising a transparent substrate,
   wherein the first layer is disposed on the transparent substrate, and
   wherein the second layer is disposed between the first layer and the transparent substrate.

4. The LARP target of claim 3, further comprising a third layer between the second layer and the transparent substrate;
   wherein the third layer is configured to reflect at least a portion of said light not reflected by the interface toward the light output surface; and
   wherein third layer is configured to selectively reflect said light depending upon the angle of the light relative to the third layer.

5. The LARP target of claim 4, further comprising a bonding layer wherein the bonding layer adjoins the second layer to the third layer; and wherein the bonding layer is a material with a refractive index higher than the refractive index of the second layer.

6. The LARP target of claim 4, further comprising:
   at least one encapsulation material at least partially surrounding the second layer and the third layer; and
   at least one platelet comprising the first layer.

7. The LARP target of claim 6, wherein the second layer is disposed between the first layer and the encapsulation material, and wherein the third layer is disposed between the second layer and the encapsulation.

8. The LARP target of claim 7, further comprising a bonding layer wherein the bonding layer adjoins the transparent substrate to the encapsulation material, and wherein the encapsulation material protects the second layer and the third layer from the bonding layer.

9. The LARP target of claim 4, wherein the third layer is a dichroic mirror.

10. The LARP target of claim 1, further comprising a heat sink thermally coupled to the first layer.

11. A method for selectively redirecting laser activated remote phosphor (LARP) emissions, comprising:

striking a phosphor with excitation light through a second major surface of a LARP target, wherein the second major surface is a light excitation input surface and a first major surface of the LARP target is a light output surface;

activating the phosphor dispersed within a first layer of a LARP target to emit a converted light;

directing at least a first portion of the converted light onto an interface between the first layer and a second layer; and reflecting at least a second portion of the first portion of the converted light using the interface to redirect the second portion;

wherein the first layer is formed of a first material having a first index of refraction; and the second layer is formed of a second material having a second index of refraction;

wherein the interface selectively reflects the converted light toward the light output surface depending upon the angle of the converted light relative to the interface.

12. The method of claim 11, further comprising:

directing a third portion of the first portion of the converted light onto a third layer, wherein the third layer comprises a dichroic mirror; and reflecting a fourth portion of the third portion of the first portion of the converted light using the dichroic mirror to redirect the fourth portion.

13. The method of claim 11, wherein an unconverted light exits the light output surface.

14. The method of claim 13, further comprising combining the converted light and the unconverted light exiting the light output surface to provide a white emission light.

15. A method of manufacturing a laser activated remote phosphor (LARP) target comprising:

forming a first major surface and a second major surface, wherein the first major surface is a light output surface and the second major surface is a light excitation input surface;

forming a first layer of a material having a first index of refraction;

dispersing a phosphor within the first layer;

disposing a second layer of a material having a second index of refraction on a major surface of the first layer;

locating an interface between the first layer and the second layer adjacent to at least a portion of the phosphor;

wherein converted light emitted via excitation of the phosphor is directed at least partially onto the interface; and wherein at least a portion of the light directed onto the interface is redirected by reflection at the interface;

wherein the interface selectively reflects the converted light toward the light output surface depending upon the angle of the converted light relative to the interface.

16. The method of claim 15, further comprising:

bonding the second layer to a third layer, the third layer comprising a dichroic mirror, wherein the dichroic mirror is oriented to reflect at least a portion of the light directed onto the interface.

* * * * *